July 19, 1960

D. W. OSMUN 2,945,720

GRAPPLING TOOL

Original Filed June 11, 1952

Dean W. Osmun
INVENTOR.

BY Charles E. Lightfoot
ATTORNEY

2,945,720

GRAPPLING TOOL

Dean W. Osmun, 5338 Fieldwood St., Houston, Tex.

Continuation of application Ser. No. 292,849, June 11, 1952. This application May 28, 1956, Ser. No. 587,533

6 Claims. (Cl. 294—96)

This invention relates to grappling tools for use in wells, and more particularly to tools designed to grippingly engage stuck objects, such as pipe and the like in the removal of such objects from wells.

This application is a continuation of a prior application, Serial No. 292,849, filed June 11, 1952, now abandoned, by the same applicant.

The invention finds particular application in the operation of oil wells for the recovery of pipe which has been broken or cut off and must be removed before operation of the well can be resumed. The invention applies to grappling tools of the overshot type and embodies improvements in the structure and mode of operation of such tools whereby their efficiency and adaptability are greatly increased.

It is an important object of the invention to provide a grappling tool of the kind referred to having improved structure for the contraction of the tool whereby the tool may be easily manipulated into secure gripping engagement with the object to be removed.

Another object of the invention is the provision of a grappling tool whose parts are constructed and arranged to facilitate release of the tool from the object or fish when it is desired to disconnect the tool from the object.

A further object of the invention is to provide a grappling tool embodying a grappling member of increased flexibility and resiliency, whereby the same is more readily conformable to the size of the object which is to be removed under the conditions of use of the tool.

A further object of the invention is to provide a grappling tool having a support provided with a spiraled tapering seat, and a grappling member carried by the support and having a tapering face conforming to the contour of and engageable with the seat to move the grappling member into gripping relation to the object to be removed.

Another object of the invention is the provision of a grappling tool having a support and an expansible grappling member carried thereby, the support and member being rotatable and movable longitudinally relative to each other and having spiraled, tapering faces engageable upon relative longitudinal movement between the support and member in one direction to cause the member to grippingly engage the object to be removed, the support having an abutment thereon positioned for endwise engagement with one end of the member upon relative longitudinal movement of the support and member in the other direction and the spiraled faces of the support and member being engageable upon rotation of the support when the member is in engagement with said abutment to contract the member into gripping contact with an object to be removed from a well and about which said member has been positioned.

A still further object of the invention is to provide a grappling tool having a support and a grappling member carried on the support in a manner to provide relative rotation and longitudinal movement between the support and member, the support and member having spiraled tapering faces arranged to engage upon relative longitudinal movement between the support and member in one direction, to grippingly engage the member with an object to be removed, said faces being disengageable upon relative longitudinal movement between the support and member in the other direction to cause the member to release the object, the support and member also having means engageable at the limits of the relative longitudinal movement of the support and member in either direction and operable upon relative rotation between the support and member to initiate longitudinal movement between the support and member in said other direction.

The invention will be more fully explained hereinafter with reference to the accompanying drawings illustrating specific examples of its structure, and in which—

Figure 1:
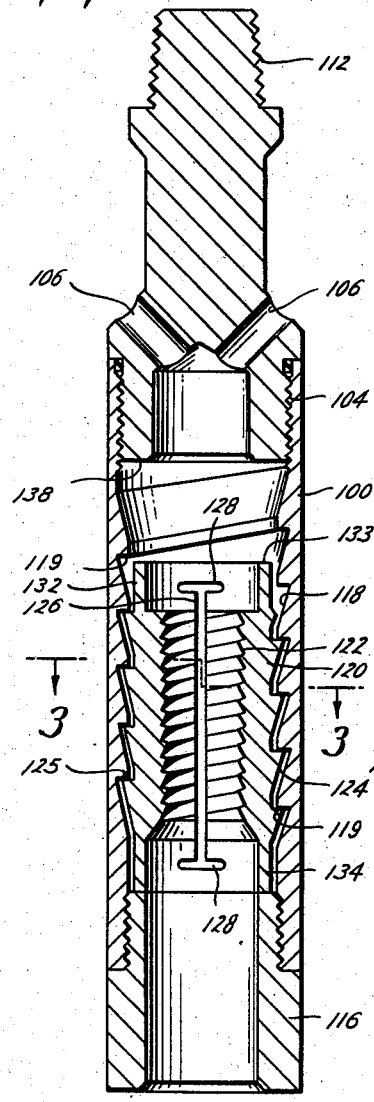
Figure 1 is a vertical, central cross-sectional view of one embodiment of the invention showing a grappling tool of the overshot type in releasing condition.
Figure 2:
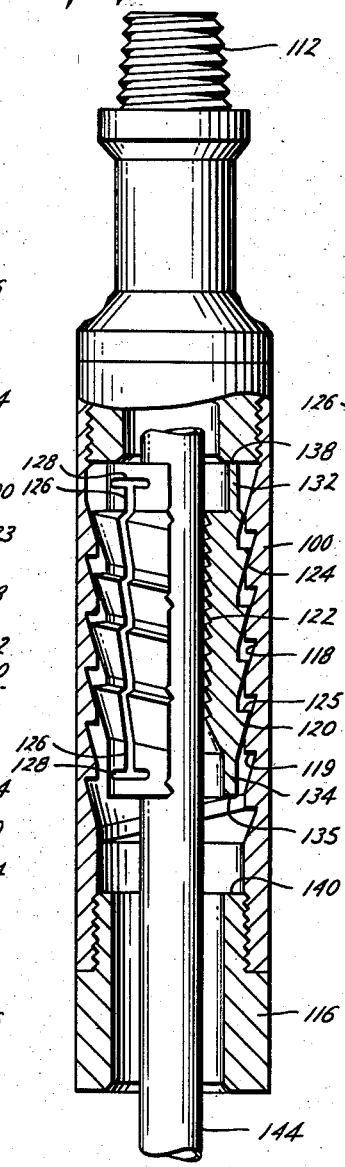
Figure 2 is a side elevational view, partly in cross-section, of the tool of Figure 1, showing the same in gripping engagement with an object to be removed from a well; and, Figure 3 is a cross-sectional view taken along the line 3—3 of Figure 1, looking in the direction indicated by the arrows.
Figure 3:
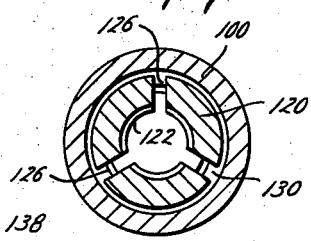

Referring now to the drawings in greater detail, the grappling tool of the invention as illustrated in Figures 1, 2 and 3 takes the form of an over-shot, which includes a support in the form of a bowl 100 of generally tubular formation, having a tubular guide portion 116 at its lower end. The bowl is provided with an internal spiraled seat 118, mediate its ends, and within the bowl there is a tubular grappling member 120, provided with internal spiraled teeth 122 adapted to grippingly engage an object to be removed from a well, such as broken pipe, indicated at 144. As its upper end the support has an externally threaded pin portion 112 by which the support may be connected to the lower end of an operating string of tubing, and beneath this pin portion the support has one or more openings 106 in communication with the interior of the support and which lead to the exterior thereof.

The grappling member 120 is also formed with an external spiraled face 124, conforming to the contour of the internal seat 118 of the bowl, and engageable therewith. The internal spiraled seat 118 of the bowl terminates in a downwardly facing shoulder 119, and the external spiraled face 124 of the grappling member terminates in an upwardly facing shoulder 125, for a purpose later to be made apparent. The shoulders 119 and 125 provide opposed surfaces extending substantially at right angles to the longitudinal axis of the bowl. Circumferentially spaced longitudinal slots 126 are also formed in the grappling member, these slots terminating in transverse slots 128, inwardly of the ends of the grappling member. A longitudinal slot 130 may also be provided in the grappling member, which extends from end to end through the member.

At its upper and lower ends the grappling member is provided with tubular portions 132 and 134, respectively, of reduced thickness, serving as tension rings, to regulate the resiliency of the grappling member, so that the member may be more readily expanded and contracted. The tension rings 132 and 134 terminate in upper and lower end faces 133 and 135, respectively, which lie in planes positioned substantially at right angles to the longitudinal axis of the bowl.

It will be apparent that the portion of the grappling member between the tension ring portions 132 and 134 may be of any desired thickness and that the thickness of this intermediate portion will not affect the resiliency and flexibility of the grappling member which can readily be determined by altering the thickness of the tension ring portions 132 and 134.

The bowl 100 has an internal, downwardly facing, annular face 133 providing an abutment extending substantially at right angles to the longitudinal axis of the support and positioned for abutting engagement with the upper end face 133 of the member at the limit of its upward movement relative to the support, and further rotation of the support in a direction tending to move the grappling member into contact with the abutment 138 results in more tightly engaging the spiraled seat with the internal spiraled face of the grappling member, thus causing the grappling member to be contracted to more tightly grip the object to be removed.

The tubular guide 116 provides an internal shoulder 140 whose surface is disposed substantially at right angles to the axis of the support and is positioned for endwise abutting engagement with the lower end face 135 of the grappling member when the member is in its lowermost position in the bowl. When the grappling member is in its lowermost position in the bowl, it will be apparent that the end face 135 of the member will be in contact with the end face 140 of the guide 116, the spiraled face 124 being out of contact with the seat 118, and the shoulders 119 and 125 being in engagement. Due to the arrangement of the shoulders 119 and 125 with their surfaces substantially at right angles to the longitudinal axis of the bowl, however, the grappling member may expand when in its lowermost position in the bowl, the shoulders 119 and 125 being in sliding contact.

In making use of the invention the bowl is attached to the lower end of a rod string by the externally threaded pin 112, and lowered into a well in the condition illustrated in Figure 1. The object to be removed, such as a broken pipe 144 is guided into the bowl through the guide 116 at the lower end of the bowl, and passes upwardly through the grappling member 120. The grappling member is preferably of a selected size such that the internal teeth 122 thereof will contact the object to be removed to expand the member somewhat as soon as the object enters the grappling member. In this condition of the tool the lower tension ring portion 134 of the grappling member may be out of abutting engagement with the internal shoulder 140 formed by the upper end of the guide 116 and the shoulders 119 and 125 of the bowl and grappling member are out of engagement, as best seen in Figure 2.

After the tool has thus been positioned over the end of the object to be removed, an upward pull exerted on the tubing string will cause the external spiraled face 124 of the grappling member to ride on the internal spiraled seat 118 of the bowl, to contract the grappling member into gripping engagement with the object, whereupon the object may be removed from the well. In the event that the lower end of the grappling member is in abutment with the upper end of guide 116 when the tool is positioned over the object, the shoulders 119 and 125 of the bowl and member will be in engagement, so that the member and bowl cannot move longitudinally relative to each other to engage the spiraled face 124 with the seat 118 to contract the member into gripping engagement with the pipe 144. Under these conditions the operating string may be rotated to the left to separate the grappling member from the guide, and move the member upwardly relative to the bowl, whereupon an upward pull on the string will engage the seat 118 with the face 124 to contract the grappling member into gripping engagement with the object.

In the event that it should become desirable to release the tool from the object the rod string may be rotated to the right, which will cause the bowl to move upwardly on the grappling member, until the lower tension ring portion 134 of the grappling member engages upper end face 140 of the tubular guide portion 116, whereupon further rotation of the rod string results in moving the spiraled seat 118 of the bowl away from the external spiraled face 124 of the grappling member, whereupon the grappling member may be rotated with the rod string to thread the grappling member off of the object, or by taking an upward pull on the rod string the grappling member may be pulled off of the object.

It will thus be seen that by operation of the tool in the manner described, sticking of the grappling member on the member by which it is supported is prevented, so that the grappling member is easily brought to its gripping or releasing position when desired, and no means is required for holding the grappling member against rotation relative to the bowl in order to assure the release or gripping engagement of the grappling member.

It will thus be seen that the invention, as above described, provides a grappling tool of simple design, having few parts which are likely to become worn or broken, and which is easily manipulated to grip or release an object to be removed from a well.

The invention has been described in connection with certain specific embodiments of the same, but it will be understood that this is intended by way of illustration only, and that numerous changes can be made in the construction and arrangement of the parts without departing from the spirit of the invention or the scope of the appended claims.

Having thus clearly shown and described the invention, what is claimed as new and desired to secure by Letters Patent is—

1. A grappling tool of the character described comprising a tubular support, means on the support for connecting the support to an operating string for rotation with the string, said support having a spiraled seat tapering radially downwardly and inwardly toward the axis of the support and terminating at its lower edge in a downwardly facing shoulder, an expansible grappling member mounted on the support for longitudinal movement relative thereto and having a tapering spiraled face to conform to the contour of and seat upon said seat and terminating at its upper edge in an upwardly facing shoulder, abutment means on the support positioned for engagement with said grappling member upon relative longitudinal movement between the support and member in a direction to disengage said face and seat to limit such relative longitudinal movement in said disengaging direction, the internal diameter of said member when the member is in an unexpanded and uncontracted condition being smaller than the external diameter of an object in a well with which the member is to be engaged, whereby the member will be expanded by the object when the member is moved into surrounding relation to the object, said seat being movable in contact with said face upon relative rotation of the support and member when said one end of said member is in engagement with said abutment means to contract said member into gripping engagement with said object.

2. A grappling tool of the character described comprising a tubular support, means on the support for connecting the support to an operating string for rotation with the string, said support having a spiraled seat, a tubular expansible grappling member mounted on the support for longitudinal movement relative thereto and having a spiraled face to conform to the contour of and seat upon said seat, said seat and face being cooperable upon relative longitudinal movement of the support and member in one direction to apply a contractive force to the grapple, the internal diameter of said member when the member is in an unexpanded and uncontracted condition being smaller than the external diameter of an object in a well with which the member is to be engaged, whereby the member will be expanded by the object when the member is moved into surrounding relation to the object, and abutment means on the support positioned for endwise abutting engagement with one end of said member upon relative longitudinal movement of the support and member in a direction to engage said seat and face, said seat being positioned for coaction with said face upon relative rotation of said support and member in one direction when said one end of said member is in engagement with said abutment means to contract said member into gripping engagement with said object prior to longitudinal movement of said support and member in said one direction.

3. A grappling tool of the character described comprising a tubular support, means on the support for connecting the support to an operating string for rotation with the string, said support having a spiraled seat, an expansible grappling member mounted on the support for longitudinal movement relative thereto and having a spiraled face to conform to the contour of and seat upon said seat, said seat and face being positioned to coact upon relative longitudinal movement of the support and member in one direction to apply a contractive force to the member, the internal diameter of said member when the member is in an unexpanded and uncontracted condition being smaller than the external diameter of an object in a well with which the member is to be engaged, whereby the member will be expanded by the object when the member is moved into surrounding relation to the object, and abutment means on the support positioned for engagement with said grappling member upon relative longitudinal movement between the support and member in the other direction to limit such relative longitudinal movement in said other direction, said seat and face being positioned to coact upon relative rotation of the support and member when said member is in engagement with said abutment means to contract said member into gripping engagement with said object.

4. A grappling tool of the character described comprising a tubular support, means on the support for connecting the support to an operating string for rotation with the string, said support having a spiraled seat tapering radially downwardly and inwardly toward the axis of the support and terminating at its lower edge in a shoulder having a downwardly facing spiraled surface disposed substantially at right angles to the longitudinal axis of said support, a tubular expansible grappling member mounted on the support for longitudinal movement relative thereto and having a tapering spiraled face to conform to the contour of and seat upon said seat and terminating at its upper edge in a shoulder, having an upwardly facing spiraled surface disposed substantially at right angles to said axis and positioned for engagement with said spiraled surface of said support upon relative longitudinal movement of the member and support in one direction to disengage said face and said seat, the internal diameter of said member when the member is in an unexpanded and uncontracted condition being smaller than the external diameter of an object in a well with which the member is to be engaged, whereby the member will be expanded by the object when the member is moved into surrounding relation to the object, abutment means on the support positioned for engagement with said grappling member upon relative longitudinal movement between the support and member in the other direction to limit such relative longitudinal movement in said other direction, said seat being movable in contact with said face upon relative rotation of the support and member when said one end of said member is in engagement with said abutment means to contract said member into gripping engagement with said object.

5. A grappling tool of the character described comprising a tubular support, means on the support for connecting the support to an operating string for rotation and longitudinal movement with the string, said support having a spiraled seat tapering radially downwardly and inwardly toward the axis of a support and terminating at its lower edge in a shoulder having a downwardly facing spiraled surface extending substantially at right angles to the longitudinal axis of the support, a tubular expansible grappling member mounted on the support for longitudinal movement relative thereto and having a tapering spiraled face to conform to the contour of and seat upon said seat upon relative longitudinal movement of the member and support in one direction and terminating at its upper edge in a shoulder having an upwardly facing spiraled surface extending substantially at right angles to said axis and positioned for engagement with said spiraled surface of said support upon relative longitudinal movement of the member and support in the other direction to disengage said face and seat, the internal diameter of said member when the member is in an unexpanded and uncontracted condition being smaller than the external diameter of the object in a well with which the member is to be engaged, whereby the member will be expanded by the object when the member is moved into surrounding relation to the object, abutment means on the support positioned for engagement with said member to limit relative longitudinal movement of the member and support in said disengaging direction, said face and seat being in engagement and being movable upon each other upon relative rotation of the support and member, when said member and abutment are in engagement to contract said member into gripping engagement with said object.

6. A grappling tool of the character described comprising a tubular support, means on the support for connecting the support to an operating string for rotation and longitudinal movement with the string, said support having a spiraled seat tapering radially downwardly and inwardly toward the axis of the support and terminating at its lower edge in a shoulder having a downwardly facing spiraled surface extending substantially at right angles to the longitudinal axis of the support, a tubular expansible grappling member mounted on the support for longitudinal movement relative thereto and having a tapering spiraled face to conform to the contour of and seat upon said seat upon relative longitudinal movement of the member and support in one direction to cause said member to grippingly engage an object extending into said member and whose external diameter is greater than the internal diameter of the member when the member is in an unexpanded condition and terminating at its upper edge in a shoulder having an upwardly facing spiraled surface extending substantially at right angles to said axis and positioned for engagement with said spiraled surface of said support upon relative longitudinal movement of the member and support in the other direction, abutment means on the support positioned for engagement with said member to limit relative longitudinal movement of the member and support in a direction to disengage said face and seat, said spiraled surfaces being in engagement and being movable upon each other upon relative rotation of the support and member in disengaging direction to impart relative longitudinal movement to the support and member in said disengaging direction to disengage said member from said abutment means.

References Cited in the file of this patent
UNITED STATES PATENTS

| | | |
|---|---|---|
| 1,757,363 | Fischbach | May 6, 1930 |
| 1,965,831 | Hamon | July 10, 1934 |
| 2,128,430 | Pryor | Aug. 30, 1938 |
| 2,281,389 | Shaffer | Apr. 28, 1942 |
| 2,491,392 | Osmun | Dec. 13, 1949 |
| 2,492,813 | Osmun | Dec. 27, 1949 |